(12) United States Patent
Lindell et al.

(10) Patent No.: US 12,413,069 B2
(45) Date of Patent: Sep. 9, 2025

(54) REDUCING TRANSFORMER INRUSH CURRENT

(71) Applicant: ABB Schweiz AG, Baden (CH)

(72) Inventors: Elisabeth Lindell, Västerås (SE); Johan Nohlert, Västerås (SE); Andrea Bianco, Sesto San Giovanni (IT); Stefan Halén, Västerås (SE); Jesper Magnusson, Åkersberga (SE)

(73) Assignee: ABB Schweiz AG, Baden (CH)

( * ) Notice: Subject to any disclaimer, the term of this patent is extended or adjusted under 35 U.S.C. 154(b) by 197 days.

(21) Appl. No.: 18/337,784

(22) Filed: Jun. 20, 2023

(65) Prior Publication Data
US 2023/0420932 A1 Dec. 28, 2023

(30) Foreign Application Priority Data

Jun. 23, 2022 (EP) ..................................... 22180635

(51) Int. Cl.
*H02H 9/00* (2006.01)
*H02H 7/04* (2006.01)

(52) U.S. Cl.
CPC .............. *H02H 9/002* (2013.01); *H02H 7/04* (2013.01)

(58) Field of Classification Search
CPC .................................. H02H 9/002; H02H 7/04
See application file for complete search history.

(56) References Cited

U.S. PATENT DOCUMENTS

| 5,563,459 A | 10/1996 | Kurosawa et al. |
| 6,493,203 B1 | 12/2002 | Ito et al. |
| (Continued) | | |

FOREIGN PATENT DOCUMENTS

| CN | 108767826 A | 11/2018 |
| CN | 112803368 A | 5/2021 |
| (Continued) | | |

OTHER PUBLICATIONS

Laboratory Investigation on Phase Selection Closing Approach for Suppression of Inrush Current. Wu et al. Nov. 2019. (Year: 2019).*

(Continued)

*Primary Examiner* — Rexford N Barnie
*Assistant Examiner* — Christopher J Clark
(74) *Attorney, Agent, or Firm* — Whitmyer IP Group LLC

(57) ABSTRACT

A method of operating a switching device in a system. The method includes monitoring a voltage; operating the system at each of a plurality of system configurations; and, for each of the system configurations and a predetermined same opening angle relative to a reference angle of the monitored voltage, determining a suitable closing angle relative to the reference angle and storing information about the determined suitable closing angle in association with the system configuration in a database. The method then includes, determining a system configuration in the system; at the predetermined same opening angle, opening the switching device; from the database, obtaining a closing angle of the determined suitable closing angles, wherein the system configuration with which the obtained closing angle is associated in the database corresponds to the determined system configuration; and at the obtained closing angle, closing the switching device.

19 Claims, 3 Drawing Sheets

(56) References Cited

U.S. PATENT DOCUMENTS

| | | | |
|---|---|---|---|
| 10,096,993 B2 | 10/2018 | Sleigh | |
| 2011/0204870 A1* | 8/2011 | Tsutada | H01H 33/593 323/355 |
| 2015/0179365 A1 | 6/2015 | Parapurath et al. | |
| 2017/0373486 A1* | 12/2017 | Yamamoto | H02H 7/04 |

FOREIGN PATENT DOCUMENTS

| | | |
|---|---|---|
| DE | 4108106 A1 | 9/1992 |
| EP | 3716432 A1 | 9/2020 |
| WO | 2021078943 A1 | 4/2021 |

OTHER PUBLICATIONS

Extended European Search Report; Application No. 22180635.9; Completed: Dec. 1, 2022; Issued: Dec. 21, 2022; 5 Pages.

\* cited by examiner

REDUCING TRANSFORMER INRUSH CURRENT

TECHNICAL FIELD

The present disclosure relates to reducing inrush current to a transformer when closing a switching device arranged between an Alternating Current (AC) voltage source and the transformer in an electrical three-phase system.

BACKGROUND

Synchronization of circuit breakers relates to controlling that the opening and/or closing of electrical contacts occurs at a specific phase angle of a reference signal (voltage or current in the system). Most circuit breakers at the medium voltage level, i.e. within the range of 1 kV to 72 kV, are not using synchronized operation. One objective of using synchronized operation can be to minimize transformer inrush current. Different methods have been proposed for finding the optimal phase angle for the contact closing to reduce the transformer inrush current. The remanent flux in the transformer core will affect the optimal closing angle. Therefore, different methods for estimating the flux and take it into account have been proposed.

A problem with finding the optimal phase angle for circuit breaker closing in order to minimize the transformer inrush current is thus that the magnetic state of the transformer core will affect the optimal angle. It is a challenge to make a good estimation of the remanent flux in the transformer core. In literature, methods can be found where voltage sensors are installed downstream of the circuit breaker (in addition to upstream ones used for a reference signal) and the voltage is integrated with respect to time in order to give an estimated value of the remanent flux. The remanent flux as estimated can then be compared to the prospective flux that would be generated if closing at certain phase angles of the upstream voltage, and thereby an optimal angle can be found.

Alternatively, simulations of the site where the circuit breaker is going to be installed can be performed, taking into account the layout of the site and the load conditions of the transformer. Based on such simulations, attempts at finding the optimal phase angle can be done. This is however associated with uncertainties, since values of all required parameters may be difficult to obtain. Furthermore, methods relying on site-specific simulations require significant engineering efforts for each circuit breaker installation.

SUMMARY

It is an objective of the present invention to provide an alternative and less complex way of reducing transformer inrush current in an electrical AC system.

According to the present invention, suitable closing angles for different system configurations are determined specifically for the operated system. Different system configurations may e.g., result from different load conditions, such as different loads, or no load, connected to the secondary side of the transformer, or from different types of equipment connected or not connected in the system e.g., on the primary side of the transformer. Herein, load conditions are used as examples of system configurations, but any other system configurations may also/alternatively be considered. These closing angles are stored in a database. During normal operation of the system, a system configuration of the system is determined whereby a suitable closing angle for that system configuration, or similar system configuration, can be retrieved from the database and used.

According to an aspect of the present invention, there is provided a method for operating a switching device arranged between an AC voltage source and a transformer in an electrical three-phase system. The method comprises, between the switching device and the voltage source, monitoring a voltage in one of the phases to determine a reference angle, e.g. the positive zero crossing of the voltage. The method also comprises, operating the system at each of a plurality of system configurations. The method also comprises, for each of the system configurations and a predetermined same opening angle relative to the reference angle, determining a suitable closing angle relative to the reference angle and storing information about said determined suitable closing angle in association with the system configuration in a database. The method then also comprises, determining a system configuration in the system. The method also comprises, at the predetermined same opening angle, opening the switching device. The method also comprises, from the database, obtaining a closing angle of said determined suitable closing angles, wherein the system configuration with which the obtained closing angle is associated in the database corresponds to the determined system configuration. The method also comprises, at the obtained closing angle, closing the switching device.

According to another aspect of the present invention, there is provided a controller comprising processing circuitry, and data storage storing instructions executable by said processing circuitry whereby said controller is operative to perform an embodiment of the method of the present disclosure.

According to another aspect of the present invention, there is provided a switching device comprising an embodiment of the controller of the present disclosure, and a sensor for the monitoring of the voltage.

According to another aspect of the present invention, there is provided an electrical system comprising an embodiment of the controller of the present disclosure, an embodiment of the switching device, and an embodiment of the transformer.

According to another aspect of the present invention, there is provided a computer program product comprising computer-executable components for causing a controller to perform an embodiment of the method of the present disclosure when the computer-executable components are run on processing circuitry comprised in the controller.

As long as the switching device is always opened at the same opening angle, the remanent flux in the transformer core will be the same, as long as the system configuration is not substantially altered, e.g. as long as the load conditions, and/or the layout of the system, are the same. Thus, suitable closing angles which are specific for different system configurations of the system may be determined in advance and stored in a database from which they can be obtained during normal operation of the same system. Only a single voltage, the voltage over time in one of the phases upstream of the switching device, needs to be monitored/measured in order to obtain a reference angle for the opening and closing angles. The switching device may be simultaneously operated, i.e. it opens and closes at the same time for all phases. Alternatively, the switching device may be single-pole operated, able to open and close each phase individually at respective times. A three-phase system is envisioned but the invention could be used for any number of one or at least two AC phases.

In some embodiments, to determine a suitable closing angle for a system configuration, the switching device is during a start-up procedure closed at specific different closing angles for a number of iterations, following opening of the switching device at a same opening angle in each of the iterations, after which a preferred closing angle can be determined based on analysis of the inrush current during these iterations, to reduce the inrush current during future operation of the switching device. An advantage is that the remanent flux is taken into account without having to estimate it. By considering the inrush current for different closing angles, a closing angle which results in reduced inrush currents can be selected for future use within the system. Thus, there is no need to estimate the remanent flux in order to select a suitable closing angle.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc., for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
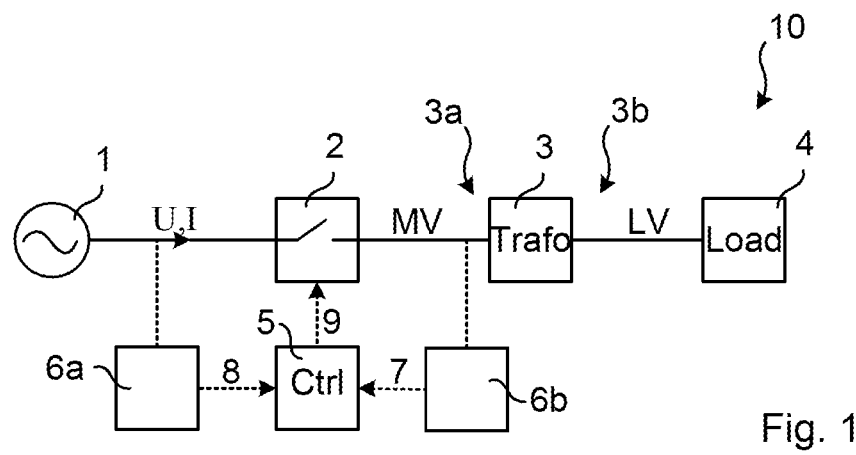
FIG. 1 is a schematic circuit diagram of an electrical system, in accordance with some embodiments of the present invention.

FIG. 1 illustrates an AC system 10 comprising an AC voltage source 1, e.g. a power grid, and a transformer 3, and a switching device 2 connected between the voltage source and the transformer, and arranged to break a current I on the primary side 3a of the transformer. The switching device 2 is herein exemplified with a circuit breaker 2, but any other suitable switching device may alternatively be used. Optionally, a load 4, may be connected to the secondary side 3b of the transformer, and thus also be comprised in the system 10.

The voltage source 1 may provide an AC voltage within the medium voltage (MV) range, e.g. within the range of 1 kV to 72 kV for the root-mean-square (rms) value of the phase-to-phase voltage, but embodiments of the present invention may be used also for voltages U outside of this range. The multi-phase voltage provided by the voltage source is typically a three-phase voltage with a 120° phase shift between the voltages, each phase voltage being, or close to, sinusoidal and having a certain amplitude or rms value and frequency, e.g. 50 or 60 Hz. In some embodiments, the transformer 3 may be arranged to transform a MV at its primary side 3a to a low voltage (LV), i.e. an AC voltage of at most 1 kV, e.g. within the range of 10-1000 V, at its secondary side 3b. However, the transformer 3 may be any type of transformer, transforming any voltage at its primary side 3a to any, other or same, voltage at its secondary side 3b, e.g. from a higher voltage within the MV range mentioned above to any lower voltage within said MV range or LV range.

The circuit breaker 2 may be simultaneously operated, implying that it opens and closes the contacts of all the phases at the same time, at a predetermined phase angle of the monitored voltage used as a reference. Since the voltages and currents in the different phases are typically shifted in relation to each other, this implies that the circuit breaker contacts in each phase are opened or closed at different phase angles of the voltage or current compared with the other phases. Typically, the circuit breaker 2 is a vacuum circuit breaker, but other types of circuit breakers may also be used with some embodiments of the present invention. The term "opens" herein refers to when the contacts of the contact pair physically separate from each other, which due to arcing is not necessarily the same as breaking of the current, which may occur later when the contacts have moved sufficiently far from each other to extinguish the arc. Similarly, the term "closes" herein refers to when the contacts of the contact pair physically come into contact with each other, which due to arcing is not necessarily the same as making of the current, which may occur earlier when the contacts have moved sufficiently close to each other to cause a pre-arc. Control signalling may be adjusted in time to account for this arcing.

A reference sensor 6a of the system 10 may be used to monitor the voltage U in one of the phases, upstream of the circuit breaker 2, to provide a reference for the opening and closing angles of the circuit breaker. Since the voltages in the different phases are phase-shifted in relation to each other with a constant shift, it is enough to monitor only one of the phases. The reference sensor 6a may send a reference signal 8 to a controller 5 of the circuit breaker 2. The controller 5 may be arranged to control the opening and closing of the circuit breaker 2 by means of a control signal 9 sent from the controller.

During normal operation, the controller 5 may be arranged to, when opening the circuit breaker 2, always open the circuit breaker at the same opening angle, and to, when closing the circuit breaker 2, close the circuit breaker at the suitable closing angle obtained from the database, depending on the determined load condition in the system 10. The reference sensor 6a may be part of the controller 5, and the controller 5 and/or the reference sensor 6a may be part of the circuit breaker 2 and/or be part of a control architecture of the system 10. Alternatively, the controller 5 may be implemented in the cloud (cloud computing).

For determining a load condition or other system configuration in the system, a current I in one of the phases may be measured, e.g. by the reference sensor 6a, while the circuit breaker is closed. For instance, a magnitude of the current I (i.e., an amplitude of the measured current) may indicate whether there is or is not a load 4 connected in the system 10, and, in case there is a load, the phase angle between the current I and the monitored voltage U may indicate a power factor of the load 4. Based on such an indication of load or no load, and optionally a power factor of the load if connected, a load condition in the system 10 may be determined. Alternatively, the system configuration may be determined based on other input, e.g. from an external system or a human operator indicating which system configuration the system 10 is currently operating in, e.g. load or no load.

During the determining of a suitable closing angle for each of a plurality of system configurations, e.g. load conditions, (herein also referred to as a start-up method), an indication of a peak value of the overall inrush current to the transformer 3 upon closing the circuit breaker 2 may be obtained, e.g. by means of an inrush sensor 6b, e.g. a current sensor and/or a voltage sensor, arranged to directly or indirectly sense the inrush current in each of the phases. Typically, the inrush sensor 6b may sense the inrush current on the primary side 3a of the transformer 3, upstream (i.e., towards the voltage source 1) or downstream (i.e., towards the transformer 3) of the circuit breaker 2. If the inrush sensor 6b is or comprises a current sensor, the inrush current may be sensed directly in each of the phases. Additionally, or alternatively, if the inrush sensor is or comprises a voltage sensor, the inrush current may be measured indirectly by measuring a voltage drop in each of the phases. There may be other ways of obtaining an indication of a peak value of the inrush current. For instance, the indication may be acoustic, e.g. sensed by an acoustic inrush sensor 6b, where a type and/or magnitude of sound produced by the inrush current may provide an indication of the peak value. The inrush sensor may thus, e.g. for each of the phases, provide the indication of a peak value of the inrush current resulting from the closing of the circuit breaker 2. This indication or other information thereof may be sent in a sensor signal 7 e.g., to the controller 5 or to another computer means for further processing. Also, the inrush sensor 6b may be comprised in the controller 5 and/or the circuit breaker 2.

The overall inrush current may be automatically estimated or calculated by the controller 5 based information in the sensor signal 7 received from the inrush sensor 6b. The overall inrush current may be estimated or calculated e.g., as the highest absolute value of the peak inrush current among the phases, or as a mean absolute value of the peak inrush current among the phases.

Then, the suitable closing angle may be automatically selected by the controller 5. Alternatively, the suitable closing angle may for instance be selected by a human operator, e.g. based on a graphical representation (such as presented in FIG. 3, for instance) of the peak value(s) of the inrush current presented to said operator. Selection by a human operator may be preferred if the sensing of the peak value(s) e.g., from an output of the inrush sensor 6b, is not clear enough for automatic selection. Thus, in some embodiments, the selecting of the closing angle for future use comprises receiving input from an operator, typically a human operator.

In accordance with some embodiments of the present invention, the inrush currents may be studied by obtaining an indication of a peak value, e.g. for each phase, of the inrush current. This may be done for each of a plurality of iterations wherein the same opening angle (relative to the reference angle of the monitored voltage) is used for all iterations, but the closing angle differs for each iteration. In this way, a suitable closing angle for future use during regular operation of the circuit breaker 2 can be selected. The different closing angles, one per iteration, may be spread, e.g. evenly spread (i.e. equidistantly), over a period, or a part of a period, of the waveform of the monitored phase voltage. For instance, if the voltage source 1 provides AC voltage of 50 Hz, the period thereof is 20 milliseconds (ms) during which time the phase angle makes a full turn from 0° to 360°. The number of iterations may be within the range of 6 to 36, corresponding to an angular shift (or distance) between any two consecutive closing angles in the sequence of iterations, if the closing angles are evenly spread over the period, of 60° to 10°, which in the case of a 50 Hz AC voltage U corresponds to a time shift (or distance) between the two consecutive closing angles of 3.333 ms to 0.555 ms. In an example, a time shift of 1 ms is used, implying 20 iterations for covering the whole period in case of 50 Hz, with an angular shift of 18°.

In some embodiments, the different closing angles, one per iteration, may be spread over only a part of a period, corresponding to a range of angles less than the full 0-360°. The part may be predetermined, e.g. based on prior knowledge on within which angular range to expect lower inrush current, or the sequence of iterations may be stopped prior to using all the closing angles prepared for, if a suitable closing angle to be selected has already been found.

Optionally, the start-up method may be performed for more than one same opening angle relative to the reference angle of the monitored voltage. This implies that iterations may first be performed for a first same opening angle, and then for a second same opening angle, optionally then for a third same opening angle, and optionally then for further opening angle(s). For instance, the start-up method may be performed sequentially for each of three different opening angles, i.e. a first, second and third opening angle, e.g. giving current interruption first in each of the three different phases (i.e. three different interruption sequences), or at six different opening angles, one for each of the six possible phase interruption sequences in a three-phase system (including both positive and negative polarity), giving current interruption first in each of the three different phases and at the two different zero crossings. Alternatively, instead of performing the start-up method for more than one opening angle, from an assumption about 120 degrees phase shift between the different phases and knowledge about the phase sequence (including positive or negative polarity), one or several suitable combination(s) of opening and closing angles may be estimated based on results of the start-up method for a single same opening angle. However, as mentioned, then prior knowledge about the phase sequence (also called phase rotation) of the three-phase voltage of the voltage source 1 is needed. A reason for not only using one opening angle may be to spread wear more evenly among the contacts of the different phases. Typically, the arcing time is longer in the first interrupting phase than the other phases, leading to more wear and aging for those contacts. Varying the opening angle, e.g. between three or six different predetermined opening angles resulting in respective different phase interruption sequences as discussed above, may then spread the aging more evenly among the contacts in the circuit breaker 2.

Figure 2:
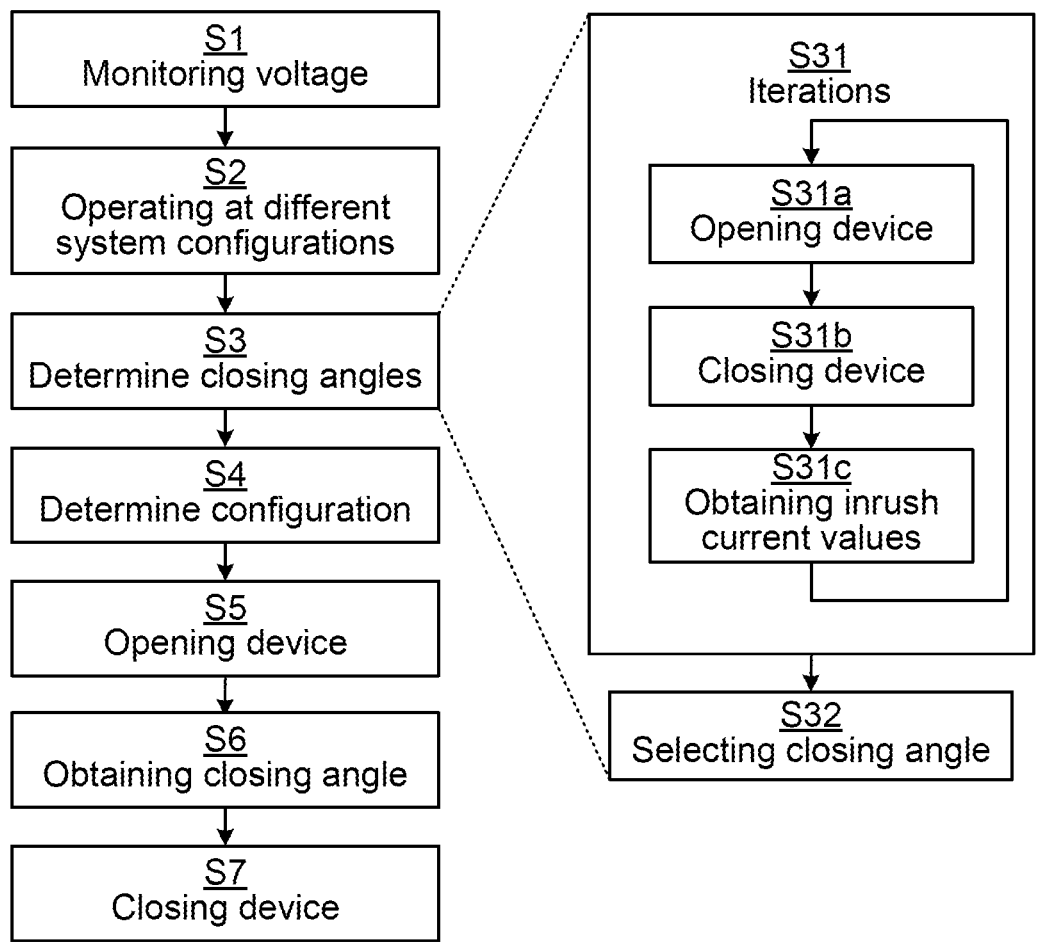
FIG. 2 is a schematic flow chart of some embodiments of the method of the present invention.

FIG. 2 illustrates some embodiments of the method of the present disclosure. The method is for operating a switching device 2 arranged between an AC voltage source 1 and a transformer 3 in an electrical three-phase system 10. The method comprises, between the switching device 2 and the voltage source 1, monitoring S1 a voltage U in one of the phases to determine a reference angle, e.g. the positive zero crossing of the voltage. The method also comprises, operating S2 the system 10 at each of a plurality of system configurations. The method also comprises, for each of the system configurations and a predetermined same opening angle relative to the reference angle of the monitored S1 voltage, determining S3 a suitable closing angle relative to the reference angle and storing information about said determined suitable closing angle in association with the system configuration in a database 44 (see FIG. 4). The method then also comprises, determining S4 a system configuration in the system 10. The method also comprises, at the predetermined same opening angle, opening S5 the switching device 2. The method also comprises, from the database 44, obtaining S6 a closing angle of said determined S3 suitable closing angles, wherein the system configuration with which the obtained S6 closing angle is associated in the database corresponds to the determined S4 system configuration. The method also comprises, at the obtained S6 closing angle, closing S7 the switching device 2.

In some embodiments of the present invention, the determining S4 of the system configuration is based on a measurement of a current I performed by, while the switching device 2 is closed, before opening the switching device, measuring the current I in one of the phases between a primary side 3a of the transformer 3 and the voltage source 1. In some embodiments, the measuring of the current comprises measuring a magnitude of the current I. Then, the determining S4 of the system configuration may comprise obtaining, based on the measured magnitude, an indication of whether or not a load 4 is connected to a secondary side 3b of the transformer 3. In some embodiments, when the indication indicates that the load 4 is connected, the measuring of the current may comprise measuring a phase angle between the current I and the voltage U. Then, the determining S4 of the system configuration may comprise determining, based on the measured phase angle, an indication of a power factor of the load 4. Additionally, or alternatively, in some embodiments of the present invention, the determining S4 of the system configuration is based on voltage measurements of the monitored S1 voltage U and/or on other voltage measurement(s) in the system 10.

In some embodiments of the present invention, the determining S3 of a suitable closing angle comprises, for each of a sequence of iterations S31: at the predetermined same opening angle, opening S31a the switching device 2; at a closing angle which is shifted in relation to the closing angle of all other iterations in the sequence S31, closing S31b the switching device 2; and obtaining S31c, e.g. for each of the phases, an indication of a peak value 21, 22 and/or 23 of an overall inrush current resulting from the closing S31b of the switching device 2. Then, the determining S3 of the suitable closing angle may comprise selecting S32 the closing angle of one of the iterations in which the overall inrush current is relatively low when compared with the other iterations of the sequence. In some embodiments, iterations for determining S3 a suitable closing angle of one system configu-ration may be interleaved with iteration(s) of one or more other system configuration(s).

In a general embodiment of the method, there is provided a method of operating a switching device 2 in a system 10. The method comprises monitoring S1 a voltage U; operating S2 the system at each of a plurality of system configurations; and, for each of the system configurations and a predetermined same opening angle relative to a reference angle of the monitored voltage, determining S3 a suitable closing angle relative to the reference angle and storing information about said determined S3 suitable closing angle in association with the system configuration in a database. The method then comprises, determining S4 a system configuration in the system; at the predetermined same opening angle, opening S5 the switching device; from the database, obtaining S6 a closing angle of said determined S3 suitable closing angles, wherein the system configuration with which the obtained S6 closing angle is associated in the database corresponds to the determined S4 system configuration; and at the obtained S6 closing angle, closing S7 the switching device 2.

Figure 3A:
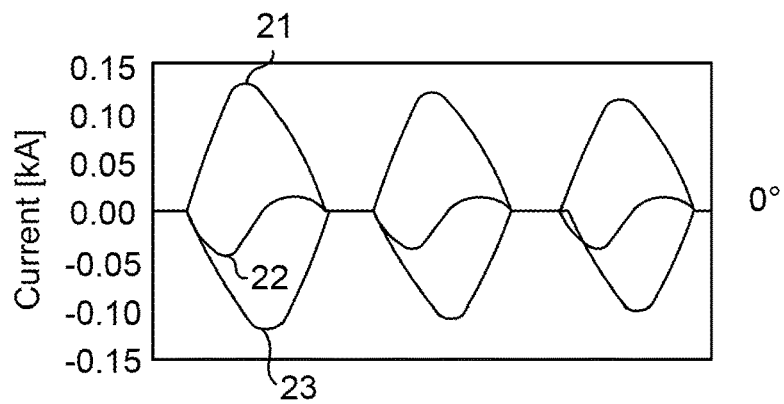
FIGS. 3A-3F are graphs showing transformer inrush currents of the three different phases over time after closing the circuit breaker at different closing angles according to an example in accordance with the present invention.
Figure 3B:
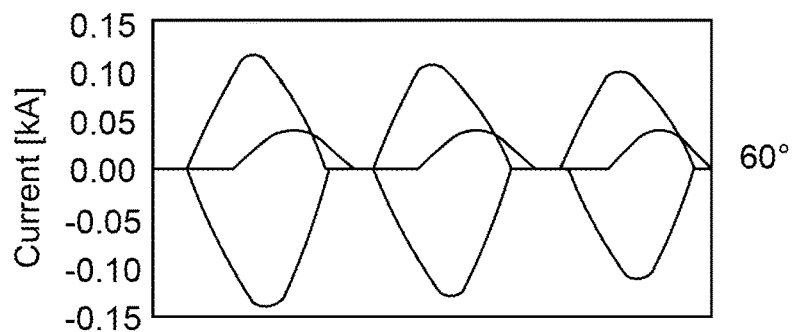
Figure 3C:
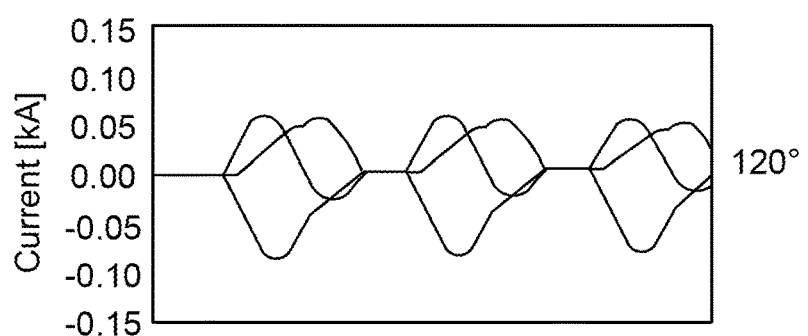
Figure 3D:
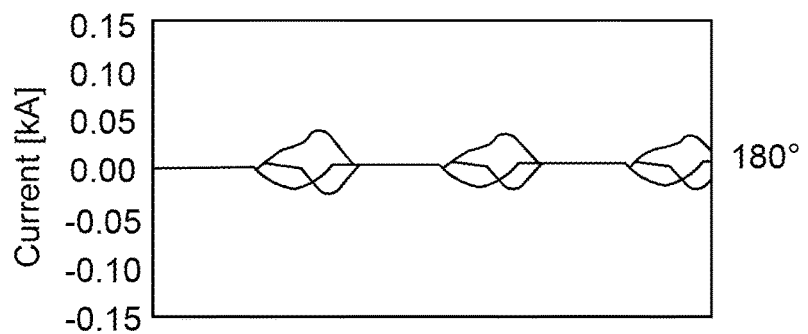
Figure 3E:
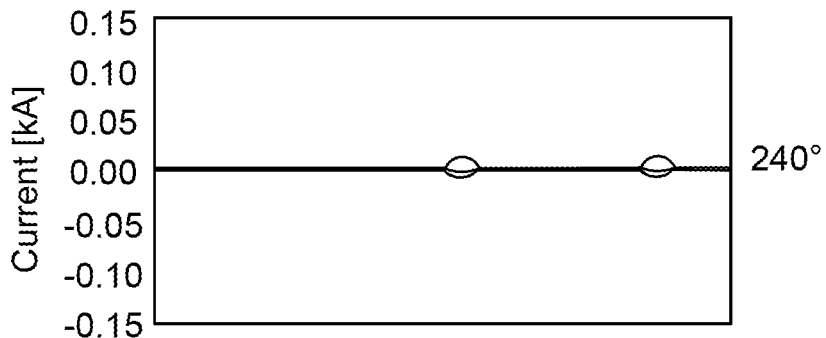
Figure 3F:
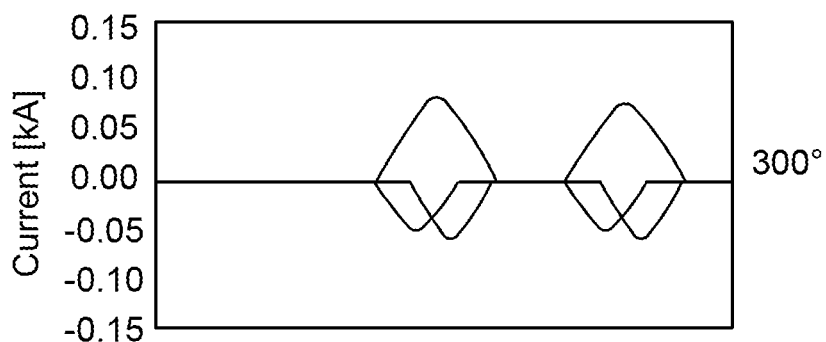

In the example of FIGS. 3A-3F, a sequence of six iterations S31 are used for a known load condition, with equidistantly spread closing angles over one period of the monitored S1 voltage U, whereby the angular distance between any two consecutive closing angles is 60°. As always, the same opening angle is used for each of the iterations in the sequence. As discussed herein, the closing (and opening) angles relate to the reference angle of the monitored S1 voltage U. Thus, FIG. 3A shows the inrush current of each of the three phases at the closing angle of 0°, FIG. 3B shows the inrush current of each of the three phases at the closing angle of 60°, FIG. 3C shows the inrush current of each of the three phases at the closing angle of 120°, FIG. 3D shows the inrush current of each of the three phases at the closing angle of 180°, FIG. 3E shows the inrush current of each of the three phases at the closing angle of 240°, and FIG. 3F shows the inrush current of each of the three phases at the closing angle of 300°. Respective peak inrush currents 21, 22 and 23 are schematically marked for each of the three phases in FIG. 3A. From the FIG. 3 it is clear that in this example, e.g. when comparing the absolute values of the inrush currents, a closing angle of 240° is preferred and thus suitable and should be stored in the database in association with the load condition.

Figure 4:
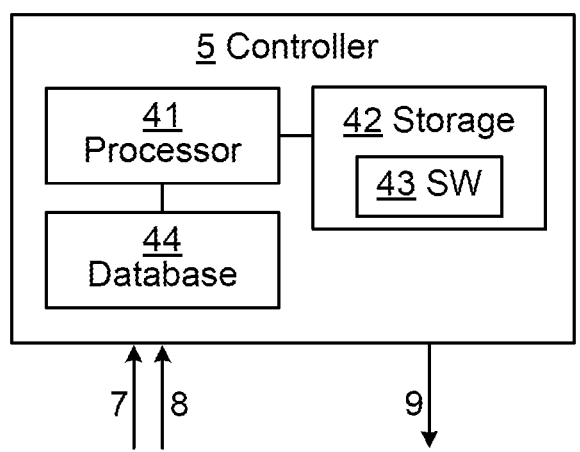
FIG. 4 is a schematic block diagram of a controller of the circuit breaker, in accordance with some embodiments of the present invention.

FIG. 4 schematically illustrates an embodiment of the controller 5 of the present disclosure. The controller 5 comprises processing circuitry 41 e.g., a central processing unit (CPU). The processing circuitry 41 may comprise one or a plurality of processing units in the form of microprocessor(s). However, other suitable devices with computing capabilities could be comprised in the processing circuitry 41, e.g. an application specific integrated circuit (ASIC), a field programmable gate array (FPGA) or a complex programmable logic device (CPLD). The processing circuitry 41 is configured to run one or several computer program(s) or software (SW) 43 stored in a storage 42 of one or several storage unit(s) e.g., a memory. The storage unit is regarded as a computer readable means 42, forming a computer program product together with the SW 43 stored thereon as computer-executable components, and may e.g., be in the form of a Random Access Memory (RAM), a Flash memory or other solid state memory, or a hard disk, or be a combination thereof. The processing circuitry 41 may also be configured to store data in the storage 42, as needed. The controller 5 may optionally comprise further devices, e.g. a transceiver for communication within the controller 5 or with other parts of the system 10, e.g. for receiving the reference signal 8 and/or the sensor signal 7, and/or for sending the control signal 9. The controller 5 may also comprise the database 44 discussed herein, e.g. as part of the storage 42 or as a separate storage, e.g. a memory.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of operating a switching device arranged between an AC voltage source and a transformer in an electrical three-phase system, the method comprising:
   between the switching device and the voltage source, monitoring a voltage in one of the phases;
   operating the system at each of a plurality of system configurations;
   for each of the system configurations and a predetermined same opening angle relative to a reference angle of the monitored voltage, determining a suitable closing angle relative to the reference angle and storing information about said determined suitable closing angle in association with the system configuration in a database;
   determining a system configuration in the system;
   at the predetermined same opening angle, opening the switching device;
   from the database, obtaining a closing angle of said determined suitable closing angles, wherein the system configuration with which the obtained closing angle is associated in the database corresponds to the determined system configuration; and
   at the obtained closing angle, closing the switching device.

2. The method of claim 1, wherein the determining of the system configuration is based on a measurement of a current in one of the phases between a primary side of the transformer and the voltage source, while the switching device is closed, before opening the switching device measuring the current.

3. The method of claim 2,
   wherein the measuring of the current comprises measuring a magnitude of the current, and
   wherein the determining of the system configuration includes obtaining, based on the measured magnitude, an indication of whether or not a load is connected to a secondary side of the transformer.

4. The method of claim 3,
   wherein, when the indication indicates that the load is connected, the measuring of the current includes measuring a phase angle between the current and the voltage, and
   wherein the determining of the system configuration includes determining, based on the measured phase angle, an indication of a power factor of the load.

5. The method of claim 1, wherein the determining of the system configuration is based on the monitored voltage or a measurement of another voltage in the system, while the switching device is closed, before opening the switching device.

6. The method of claim 1, wherein the determining of a suitable closing angle comprises:
   for each of a sequence of iterations:
   at the predetermined same opening angle, opening the switching device;
   at a closing angle relative to the reference angle, which is shifted in relation to the closing angle of all other iterations in the sequence, closing the switching device; and
   obtaining, an indication of a peak value of an overall inrush current resulting from the closing of the switching device; and
   selecting the closing angle of one of the iterations in which the overall inrush current is relatively low when compared with the other iterations of the sequence.

7. The method of claim 6, wherein the closing angle in each iteration is shifted in relation to the respective closing angles of the other iterations, the closing angles of all the iterations being equidistantly spread over a period of the monitored phase voltage, or a part of said period.

8. The method of claim 7, wherein the closing angles in the iteration are equidistantly spread at an angular distance within the range of 10° to 60°, and/or at a time distance within the range of 0.55 to 3.33 ms.

9. The method of claim 6, wherein the obtaining of an indication includes measuring a current in each of the phases upon the closing of the switching device by means of a current sensor on the primary side of the transformer.

10. The method of claim 6, wherein the obtaining of an indication includes measuring a voltage drop in each of the phases upon the closing of the switching device by means of a voltage sensor on the primary side of the transformer.

11. The method of claim 1, wherein the voltage source provides a phase-to-phase voltage within the range of 1 kV to 72 kV.

12. A controller comprising:
    processing circuitry; and
    data storage storing instructions executable by said processing circuitry whereby said controller is operative to perform a method of operating a switching device arranged between an AC voltage source and a transformer in an electrical three-phase system, the method comprising:
       between the switching device and the voltage source, monitoring a voltage in one of the phases;
       operating the system at each of a plurality of system configurations;
       for each of the system configurations and a predetermined same opening angle relative to a reference angle of the monitored voltage, determining a suitable closing angle relative to the reference angle and storing information about said determined suitable closing angle in association with the system configuration in a database;
       determining a system configuration in the system;
       at the predetermined same opening angle, opening the switching device;
       from the database, obtaining a closing angle of said determined suitable closing angles, wherein the system configuration with which the obtained closing angle is associated in the database corresponds to the determined system configuration; and
       at the obtained closing angle, closing the switching device.

13. A switching device comprising:
    a controller having:
       processing circuitry; and
       data storage storing instructions executable by said processing circuitry whereby said controller is operative to perform a method of operating the switching device arranged between an AC voltage source and a transformer in an electrical three-phase system, the method comprising:
between the switching device and the voltage source, monitoring a voltage in one of the phases;
operating the system at each of a plurality of system configurations;
for each of the system configurations and a predetermined same opening angle relative to a reference angle of the monitored voltage, determining a suitable closing angle relative to the reference angle and storing information about said determined suitable closing angle in association with the system configuration in a database;
determining a system configuration in the system;
at the predetermined same opening angle, opening the switching device;
from the database, obtaining a closing angle of said determined suitable closing angles, wherein the system configuration with which the obtained closing angle is associated in the database corresponds to the determined system configuration;
at the obtained closing angle, closing the switching device, and a sensor for the monitoring of the voltage.

14. An electrical system comprising:
a controller having:
processing circuitry; and
data storage storing instructions executable by said processing circuitry whereby said controller is operative to perform a method of operating a switching device arranged between an AC voltage source and a transformer in the system, the system being an electrical three-phase system, the method comprising:
between the switching device and the voltage source, monitoring a voltage in one of the phases;
operating the system at each of a plurality of system configurations;
for each of the system configurations and a predetermined same opening angle relative to a reference angle of the monitored voltage, determining a suitable closing angle relative to the reference angle and storing information about said determined suitable closing angle in association with the system configuration in a database;
determining a system configuration in the system;
at the predetermined same opening angle, opening the switching device;
from the database, obtaining a closing angle of said determined suitable closing angles, wherein the system configuration with which the obtained closing angle is associated in the database corresponds to the determined system configuration;
at the obtained closing angle, closing the switching device,
the switching device, and
the transformer.

15. A computer program product comprising computer-executable components which, when run on processing circuitry included in a controller, causes the controller to perform a method of operating a switching device arranged between an AC voltage source and a transformer in an electrical three-phase system, the method comprising:
between the switching device and the voltage source, monitoring a voltage in one of the phases;
operating the system at each of a plurality of system configurations;
for each of the system configurations and a predetermined same opening angle relative to a reference angle of the monitored voltage, determining a suitable closing angle relative to the reference angle and storing information about said determined suitable closing angle in association with the system configuration in a database;
determining a system configuration in the system;
at the predetermined same opening angle, opening the switching device;
from the database, obtaining a closing angle of said determined suitable closing angles, wherein the system configuration with which the obtained closing angle is associated in the database corresponds to the determined system configuration; and
at the obtained closing angle, closing the switching device.

16. The method of claim 2, wherein the determining of a suitable closing angle comprises:
for each of a sequence of iterations:
at the predetermined same opening angle, opening the switching device;
at a closing angle relative to the reference angle, which is shifted in relation to the closing angle of all other iterations in the sequence, closing the switching device; and
obtaining, an indication of a peak value of an overall inrush current resulting from the closing of the switching device; and
selecting the closing angle of one of the iterations in which the overall inrush current is relatively low when compared with the other iterations of the sequence.

17. The method of claim 2, wherein the voltage source provides a phase-to-phase voltage within the range of 1 kV to 72 kV.

18. The method of claim 7, wherein the obtaining of an indication includes measuring a current in each of the phases upon the closing of the switching device by means of a current sensor on the primary side of the transformer.

19. The method of claim 7, wherein the obtaining of an indication includes measuring a voltage drop in each of the phases upon the closing of the switching device by means of a voltage sensor on the primary side of the transformer.

* * * * *